No. 784,642. PATENTED MAR. 14, 1905.
G. A. THODE.
TRANSMISSION GEAR FOR AUTOMOBILES.
APPLICATION FILED MAR. 25, 1903.
2 SHEETS—SHEET 2.
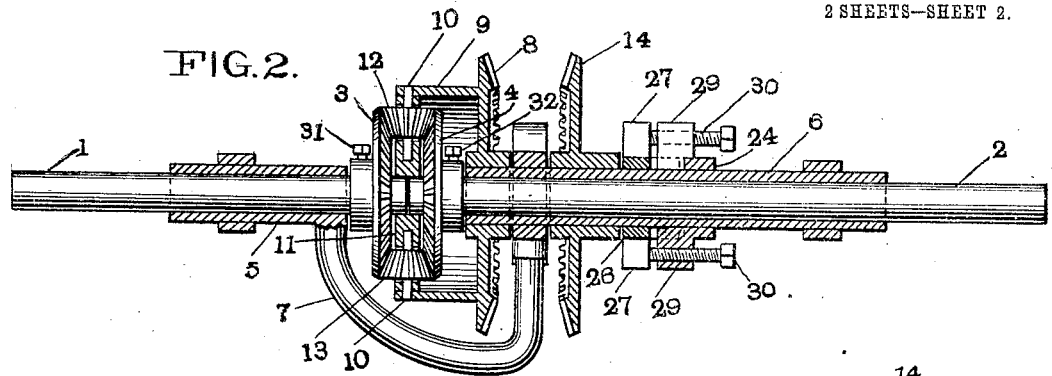
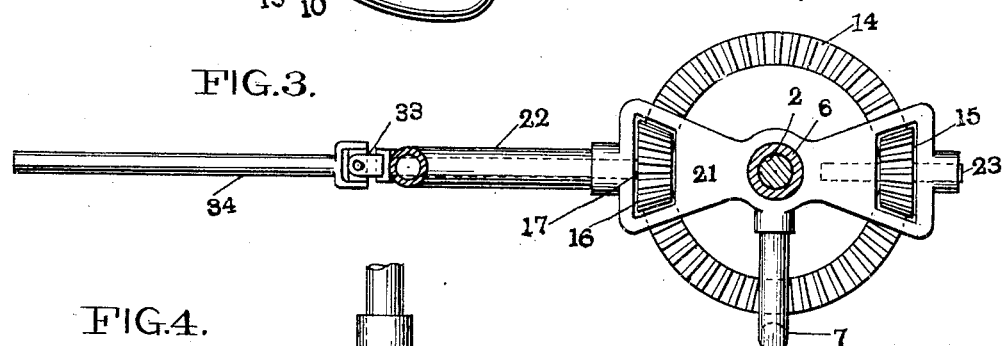
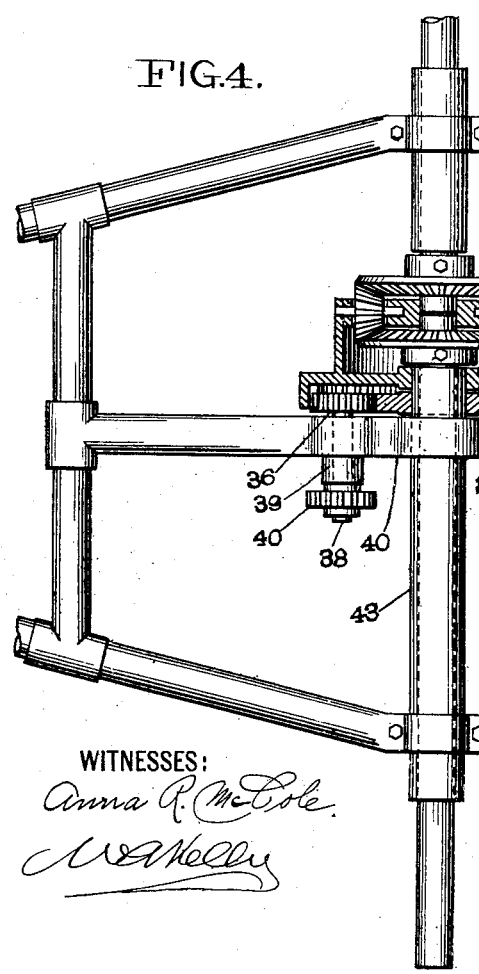
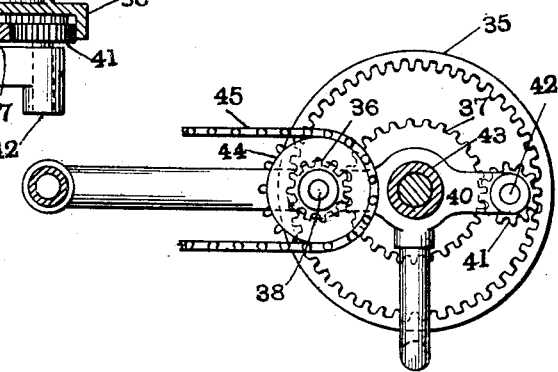
WITNESSES:
Anna R. McCole
W. A. Kelly
INVENTOR
Gustav A. Thode
BY
Edward P. Thompson
ATTORNEY No. 784,642. Patented March 14, 1905.

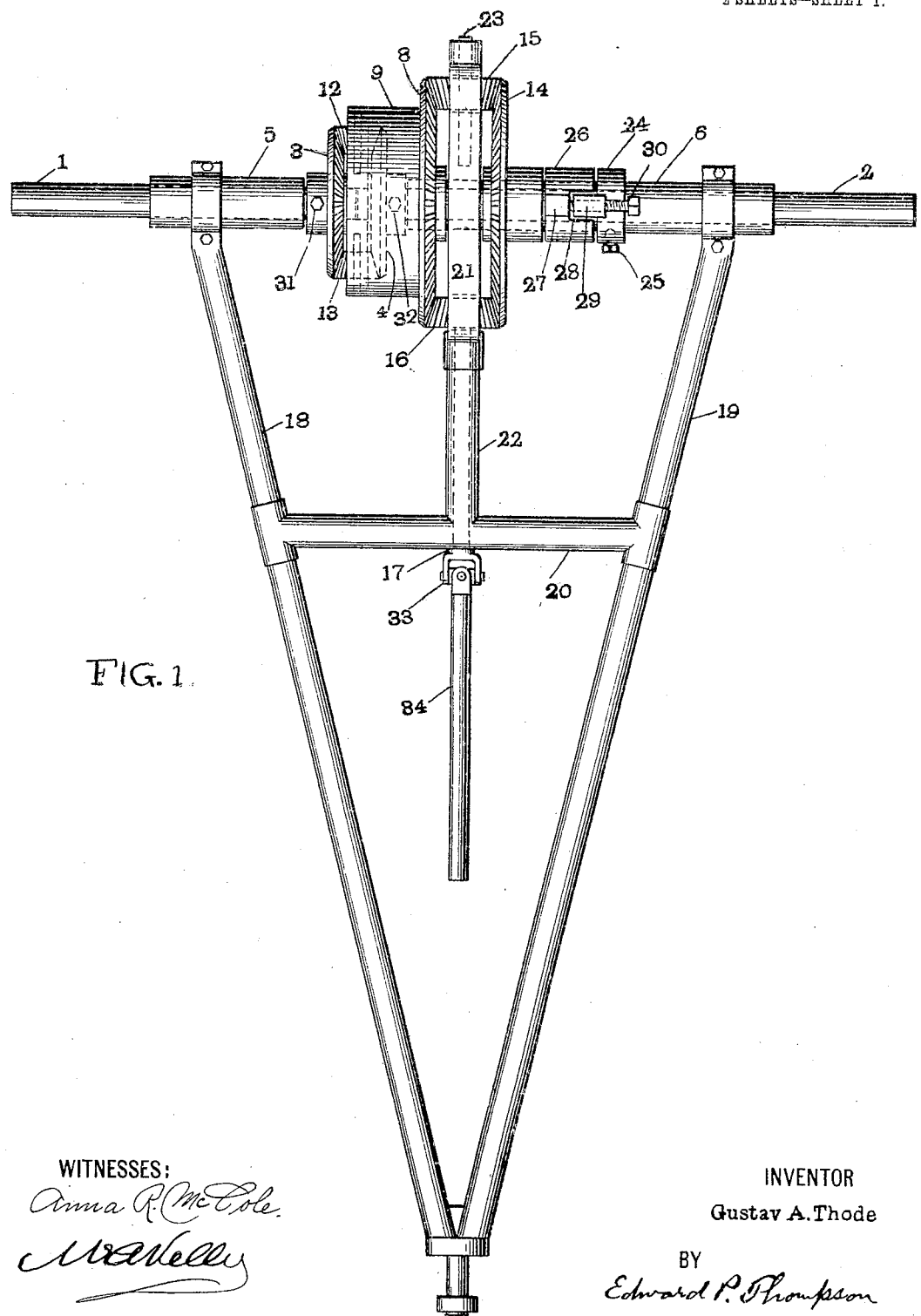

UNITED STATES PATENT OFFICE.

GUSTAV A. THODE, OF MIDDLEBRANCH, NEBRASKA.

TRANSMISSION-GEAR FOR AUTOMOBILES.

SPECIFICATION forming part of Letters Patent No. 784,642, dated March 14, 1905.

Application filed March 25, 1903. Serial No. 149,415.

*To all whom it may concern:*

Be it known that I, GUSTAV A. THODE, a citizen of the United States of America, and a resident of Middlebranch, in the county of Holt and State of Nebraska, have invented certain new and useful Improvements in Transmission-Gear for Automobiles, of which the following is a specification.

My invention relates to an improved transmission-gear for automobiles, and has for its principal object to balance the driving force on the axle, also on the driving-shaft, so as to do away with all side strain on the said axle or shaft.

For further description reference will now be had to the drawings.

Figure 1 is a top view of a part of an automobile-frame and driving-gear, showing my invention in its preferred form applied thereto. Fig. 2 is a vertical section parallel to the axle 1 2 in Fig. 1. Fig. 3 is a detail and shows the frame by which the pinions are held in position. Fig. 4 is a view similar to Fig. 1, but illustrates a modification in which spur-gears are employed instead of bevel-gears, as shown in the preferred form. Fig. 5 is a detail of the construction shown in Fig. 4 and makes clear the manner in which the gears intermesh.

The following is a description in detail of the preferred form of my invention.

The two axially-alined shafts 1 2 constitute a two-part axle of an automobile, and rigidly secured on their abutting ends, respectively, are the two bevel-wheels 3 4. The shafts 1 2 are held in place by the sleeves 5 6, constituting bearings therefor, and the said sleeves are connected together by the brace 7. A bevel-gear 8, having an extended integral flange 9, is loosely mounted on sleeve 6, and secured within the flange 9 by pins 10 is a block 11, the said block closely embracing the two abutting ends of the shafts 1 2 and carrying the bevel-pinions 12 13, which mesh with the wheels 3 4 and have bearings on the said pins 10. The wheels 3 4 constitute members of an ordinary compensating gear, of which 12 and 13 are the equalizing-pinions, and, as is seen, these pinions are carried by the flange 9 of the gear 8, so that the shafts 1 and 2 are operatively connected with the gear 8 through a compensating gear, as described. A second bevel-gear 14 is also loosely mounted on the sleeve 6 and faces the first-named gear 8, this second bevel-gear being an idler. Two axially-alined bevel-pinions 15 16 are located between the bevel-gears 8 14, the pinion 15 being an idler and the pinion 16 being fixed on the shaft 17, and it is to be noted that both of the pinions 15 16 mesh with each of the gears 8 and 14 at diametrically opposite points thereon, also that the meshing points on each of the pinions 15 16 are diametrically opposite to each other. The sleeves 5 and 6, the brace 7, the side bars 18 19, the cross-bar 20, the frame-piece 21, and the connecting-tube 22 are all suitably joined together, forming the frame of the device. The shaft 17 extends through the tube 22, which constitutes a bearing for the same. The piece 21 surrounds the pinions 15 16 and has seated therein a pin 23, which forms a bearing for the idler 15. Fixed on the sleeve 6, surrounding the shaft 2, is a collar 24, held in place by a set-screw 25, and loosely mounted on the sleeve 6 between the collar 25 and the idle gear 14 and abutting against the said idle gear is a second collar 26.

On the collar 26 are two diametrically opposite projecting lugs 27. Also in said collar are two similarly-located recesses 28, the recesses being on the same sides of the collar as the lugs. Also on the collar 24 are two diametrically opposite lugs 29, the said lugs 29 projecting both in a radial and in a lateral direction. The lugs 29 enter the recesses 28, and adjusting-screws 30 pass through the lugs 29 and abut against the lugs 27. The wheels 3 and 4, belonging to the compensating gear, are retained on the respective shafts 1 and 2 by the set-screws 31 32. A universal joint 33 connects the shaft 17 with a shaft 34, the said shaft 34 representing the source of power which drives the machine.

I will now describe the modification of my device heretofore mentioned. In the modified form the internal spur-gear 35 corresponds to the bevel-gear 8 in the preferred form and the shaft 38 to the shaft 17. The only essential points of difference are the employment of spur wheels and pinions instead of bevel and the resultant extending of the shaft 38 in a different direction to the shaft 17. The shaft 38 has a bearing 39 in the frame-piece 40, and secured on the shaft 38 is a spur-pinion 36, which meshes with the gear 35. An idle spur-pinion 41 meshes with the spur-gear 35 at a point diametrically opposite to the pinion 38, and on a line between the pinions 38 and 41 and meshing with both is the idle gear 37. The idler 41 turns loosely on the shaft 42, carried by the frame-piece 40, and the idle gear 37 revolves freely on the sleeve 43. The driving power is applied to the shaft 38 either by means of a sprocket-wheel 44 and chain 45, or by a gear-wheel 46, or, if desired, a source of power may be located directly on the shaft 38. It is to be especially noted that the two points of application of power to the gear-wheel 35 and the two points of distribution of power from the pinion 36 have in each case diametrically opposite locations on said wheel and on said pinion and incidentally that this is also true of the idlers 37 and 41, respectively.

In the operation of my device the power applied to the pinion 16 through the shaft 17 is transferred at one point directly to the gear 8 and at a diametrically opposite point on the said pinion 16 is transferred in equal amount to the gear 14. The power received by the gear 14 is transferred to the pinion 15, by which in turn it is directly communicated to the gear 8, the point on the gear 8 at which the power from the pinion 15 is received being diametrically opposite to the point at which power is received by said gear 8 from the pinion 16. It is also obvious that the same amount of power is transferred to the gear 8 by the pinion 15 as is transferred to it by the pinion 16, as the leverage in each case is and must necessarily be the same. As the power distributed is thus balanced on the pinion 16, there is no side strain brought to bear on the shaft 17 and its bearings. Also, as an equal amount of power is communicated to the gear 8 at diametrically opposite points thereon it is obvious that there can be no strain on the shaft 2 or sleeve 6.

The power received by the gear 8 is communicated to the shafts 1 and 2 through the flange 9, equalizing-pinions 12 13, and gears 3 4. The block 11 helps to hold the gear 8 steady and to keep the shafts 1 2 in perfect alinement, as well as providing a support for the pinions 12 13.

The idle gear 14 can be adjusted along the sleeve 6, and thus in and out of mesh with the pinions 15 16 by turning the screws 30, and thus forcing the collar 26 toward or allowing it to move away from the said idler 14. The collar 24 is retained in fixed adjustment by the set-screw 25, and the lugs 29 entering the recesses 28 prevent the collar 26 from revolving, while allowing free lateral adjustment.

The frame, made up of the sleeves 5 and 6, the brace 7, the side bars 18 19, the cross-bar 20, the frame-piece 21, and the tube 22, supports the various members of the device and retains them in place.

The operation of the modified construction of my device is substantially the same as that just described and the result is precisely the same. The power communicated to the pinion 36 is equally divided and transferred from two diametrically opposite points thereon to the gears 35 and 37. The gear 37 being an idler, the power received thereby is transferred through the idle pinion 41 to the gear-wheel 35, the said gear-wheel 35 receiving power from the pinion 41 at a point diametrically opposite to the power received from the pinion 36. From the foregoing it is seen that the power is equally divided between diametrically opposite points on the wheel 35 and also on the pinion 36, from which it is clearly obvious that there can be no side strain either on the sleeve 43 or on the shaft 38.

I claim as my invention—

1. A transmission-gear for automobiles, consisting of the combination of a shaft, a compensating gear, a second shaft axially alined with the first-named shaft, said compensating gear connecting the said shafts, a gear-wheel loosely mounted on the said second shaft and connecting directly to said compensating gear, a driving-pinion meshing with said gear-wheel, an idle gear also mounted on said second shaft and meshing with said pinion, and an idle pinion meshing with both said idle gear and said gear-wheel.

2. A transmission-gear for automobiles, consisting of the combination of a shaft, a gear-wheel loosely mounted on said shaft, a driving-pinion meshing with said gear-wheel, an idle gear also mounted on said shaft and meshing with said pinion, an idle pinion meshing with both said idle gear and said gear-wheel, and means for adjusting said idle gear to different positions along said shaft.

3. A transmission-gear for automobiles, consisting of the combination of a shaft, a gear-wheel loosely mounted on said shaft, a driving-pinion meshing with said gear-wheel, an idle gear also mounted on said shaft and meshing with said pinion, an idle pinion meshing with both said idle gear and said gear-wheel, a collar secured on said shaft, a second collar mounted loosely on said shaft between said idle gear and said first-named collar, and means carried by said first-named collar for adjusting said second collar to or from said idle gear.

4. A transmission-gear for automobiles, consisting of the combination of a shaft, a gear-wheel loosely mounted on said shaft, a driving-pinion meshing with said gear-wheel, an idle gear also mounted on said shaft and meshing with said pinion, an idle pinion meshing with both said idle gear and said gear-wheel, a collar fixed on said shaft, a second collar loosely mounted on said shaft between said first-named collar and said idle gear, two diametrically opposite projecting lugs on said second collar, also two similarly-located recesses in said second collar, two diametrically opposite projecting lugs on said first-named collar, said last-named lugs engaging in said recesses respectively, and adjusting-screws passing through the lugs on the first-named collar and engaging the lugs on the second collar.

5. A transmission-gear for automobiles, consisting of the combination of a shaft, a gear-wheel loosely mounted on said shaft, a driving-pinion meshing with said gear-wheel, an idle gear also mounted on said shaft and meshing with said pinion, an idle pinion meshing with both said idle gear and said gear-wheel, a collar fixed on said shaft, a second collar loosely mounted on said shaft between said first-named collar and said idle gear, means for preventing rotation of the second collar, two diametrically opposite projecting lugs on said second collar, two similarly-located lugs on said first-named collar, and adjusting-screws passing through the lugs on the first-named collar and engaging the lugs on the second collar.

6. A transmission-gear for automobiles, consisting of the combination of two bevel-gears facing each other and loosely mounted on the same shaft, one of said gears being an idler, two bevel-pinions located between said gears and each of said pinions meshing with both of said gears at diametrically opposite points thereon, and a shaft to which one of said pinions is secured, the other of said pinions being an idler.

7. A transmission-gear for automobiles, consisting of the combination of two bevel-gears facing each other and loosely mounted on the same shaft, one of said gears being an idler, two bevel-pinions located between said gears and each of said pinions meshing with both of said gears at diametrically opposite points thereon, one of said pinions being an idler, a shaft to which the other of said pinions is secured, a frame located between said gears, and bearings on said frame for said shafts and said pinions.

8. A transmission-gear for automobiles, consisting of the combination of two bevel-gears facing each other and loosely mounted on the same shaft, one of said gears being an idler, two bevel-pinions located between said gears and each of said pinions meshing with both of said gears at diametrically opposite points thereon, one of said pinions being an idler, a shaft to which the other of said pinions is secured, a frame located between said gears, said frame surrounding said pinions, and bearings on said frame for said shafts and said pinions.

9. A transmission-gear for automobiles, consisting of the combination of a shaft, two bevel-gears facing each other and loosely mounted on the said shaft, one of said gears being an idler, two bevel-pinions located between said gears and each of said pinions meshing with both of said gears at diametrically opposite points thereon, one of said pinions being an idler, a second shaft on which the other of said pinions is secured, a frame located between said gears and surrounding said pinions, and an extension on said frame forming a housing for said second shaft, and bearings on said frame for said shafts and said pinions.

10. A transmission-gear for automobiles, consisting of the combination of a shaft, two bevel-gears facing each other and loosely mounted on the said shaft, one of said gears being an idler, two bevel-pinions located between said gears and each of said pinions meshing with both of said gears at diametrically opposite points thereon, one of said pinions being an idler, a second shaft on which the other of said pinions is secured, a frame located between said gears and surrounding said pinions, an extension on said frame forming a housing for said second shaft, and bearings on said frame for said second shaft and said pinions.

11. A transmission-gear for automobiles, consisting of the combination of a shaft, two bevel-gears facing each other and loosely mounted on the said shaft, one of said gears being an idler, two bevel-pinions located between said gears and each of said pinions meshing with both of said gears at diametrically opposite points thereon one of said pinions being an idler, a second shaft on which the other of said pinions is secured, a frame between said gears and surrounding said pinions, and bearings on said frame for said pinions.

12. A transmission-gear for automobiles, consisting of the combination of a shaft, two bevel-gears facing each other and loosely mounted on the same shaft, one of said gears being an idler, two bevel-pinions located between said gears and each of said pinions meshing with both of said gears at diametrically opposite points thereon, one of said pinions being an idler, a second shaft on which the other of said pinions is secured, a frame located between said gears and surrounding said pinions, a bearing at one portion of said frame for said second shaft, and a pin having a seating at the opposite portion of said frame, said pin forming a bearing for said idle pinion.

13. A transmission-gear for automobiles, consisting of the combination of two axially-alined shafts, a compensating gear connecting the said shafts, equalizing-pinions for said compensating gear, bearings for said equalizing-pinions, a bevel-gear loosely mounted on one of said shafts, a tube-like flange integral with the back of said bevel-gear, said bearings being secured to the inside of said flange, a second bevel-gear loosely mounted on the same shaft and facing the first-named gear, said last-named gear being an idler, two bevel-pinions located between said gears and each of said pinions meshing with both of said gears at diametrically opposite points thereon, one of said pinions being an idler, a third shaft on which the other of said pinions is secured, a frame located between said gears and surrounding said pinions, a bearing at one portion of said frame for said third shaft, and a pin having a seating at the opposite portion of said frame, said pin forming a bearing for said idle pinion.

14. A transmission-gear for automobiles, consisting of the combination of two axially-alined shafts, a compensating gear connecting the said shafts, equalizing-pinions for said compensating gear, bearings for said equalizing-pinions, a bevel-gear loosely mounted on one of said shafts, a tube-like flange integral with the back of said bevel-gear, said bearings being secured to the inside of said flange, a second bevel-gear loosely mounted on the same shaft and facing the first-named gear, said last-named gear being an idler, two bevel-pinions located between said gears and each of said pinions meshing with both of said gears at diametrically opposite points thereon, one of said pinions being an idler.

15. A transmission-gear for automobiles, consisting of the combination of two axially-alined shafts, a compensating gear connecting the said shafts, equalizing-pinions for said compensating gear, bearings for said equalizing-pinions, a bevel-gear loosely mounted on one of said shafts, a tube-like flange integral with the back of said bevel-gear, said bearings being secured to the inside of said flange, a second bevel-gear loosely mounted on the same shaft and facing the first-named gear, said last-named gear being an idler, two bevel-pinions located between said gears and each of said pinions meshing with both of said gears at diametrically opposite points thereon, one of said pinions being an idler, a third shaft on which the other of said pinions is secured, a collar fixed on the same shaft on which the two bevel-gears are mounted, a second collar loosely mounted on said shaft between, and contiguous to both, said first-named collar and said idle gear, two diametrically opposite projecting lugs on said second collar, also two similarly-located recesses in said second collar, two diametrically opposite projecting lugs on said first-named collar, said last-named lugs engaging in said recesses respectively, adjusting-screws passing through the lugs on the first-named collar and engaging the lugs on the second collar, a frame, bearings on said frame for all of said shafts, a portion of said frame extending between said bevel-gears and surrounding said pinions, and a pin having a seating in said frame portion, said pin forming a bearing for said idle pinion.

16. A transmission-gear for automobiles, consisting of the combination of a rotary shaft, a bevel-gear mounted on the said shaft and operatively connected thereto, a second bevel-gear like the first loosely mounted on said shaft and facing the said first-named gear, said second gear being an idler, two bevel-pinions located between said gears and each of said pinions meshing with both of said gears at diametrically opposite points thereon, one of said pinions being an idler, a shaft to which the other of said pinions is secured, a frame located between said gears, and bearings on said frame for said shafts and said pinions.

17. A transmission-gear for automobiles consisting of the combination of a rotary shaft, a bevel-gear mounted on the said shaft and operatively connected thereto, a second bevel-gear like the first loosely mounted on said shaft and facing the said first-named gear, said second gear being an idler, two bevel-pinions located between said gears and each of said pinions meshing with both of said gears at diametrically opposite points thereon, one of said pinions being an idler, a second shaft to which the other of said pinions is secured, a frame located between said gears, said frame surrounding said pinions, and bearings on said frame for said shafts and said pinions.

In testimony whereof I have signed my name and affixed my seal this 17th day of March, 1903.

GUSTAV A. THODE. [L. S.]

Witnesses:
  W. C. CALEY,
  AMELIA A. THODE.